March 14, 1944. C. H. EVANS 2,344,346
PREPARATION OF CHLORINE DIOXIDE
Filed Feb. 1, 1939
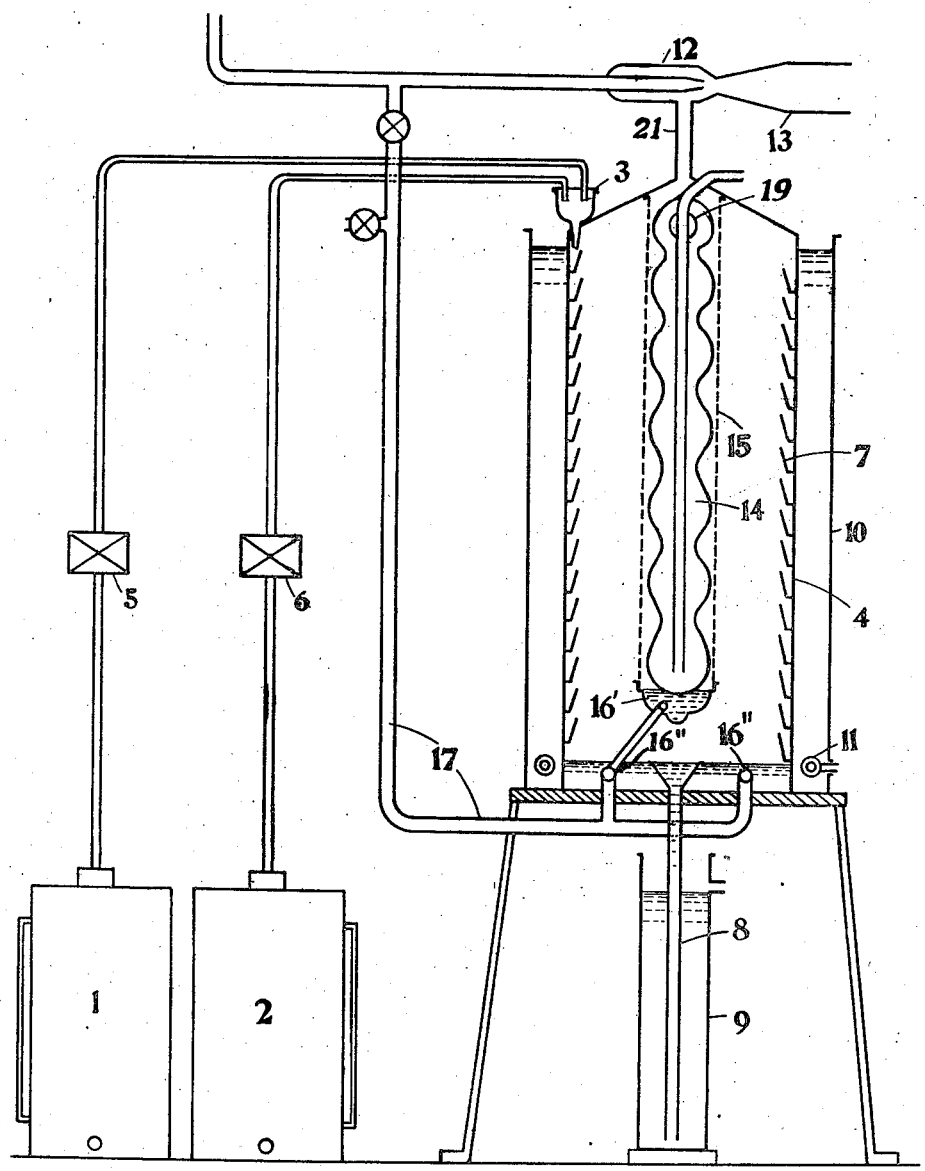
Inventor
C. H. Evans
by
W. E. Evans
Attorney.

Patented Mar. 14, 1944

2,344,346

UNITED STATES PATENT OFFICE 2,344,346

PREPARATION OF CHLORINE DIOXIDE

Cyril Harry Evans, Woodford Green, England

Application February 1, 1939, Serial No. 254,117
In Great Britain February 1, 1938

12 Claims. (Cl. 23—152)

This invention relates to the preparation of chlorine dioxide which is adapted for the various industrial purposes for which its use is indicated.

The invention has among its objects to provide for the continuation and efficient production of chlorine dioxide under control.

According to the Work of Pebal (Liebig's Annalen, 1875, 177, 1) it is known that a mixture of about equal parts of chlorine and chlorine dioxide can be produced in a reaction between hydrochloric acid and solid potassium chlorate, whereby an intensely yellow gas is produced that is condensed easily to a brown liquid. The product is unstable and highly explosive and inasmuch as the reaction is also slow and impossible of control in that one of the reactants are in the solid state, it cannot be utilised commercially. Furthermore as in the reaction described by Pebal approximately only one volume of chlorine dioxide is produced to one volume of chlorine the efficiency of the reaction is low, only about 50% of the chlorine dioxide theoretically available from the chlorate being produced.

Now this invention consists in a method of preparing chlorine dioxide from a chlorate and a suitable acid or acids in which the reagents necessary for the production of the chlorine dioxide are continuously brought when in solution into contact with one another in such a manner that any such reagents do not mix to any substantial extent during their production of chlorine dioxide with any other such reagents in a different stage of the reaction or the products formed thereby.

If the fresh reagents were permitted to mix with the other reagents in a different stage of the reaction and with those products of the reaction which would remain in solution then undesirable reactions would take place. Similarly undesirable reactions would take place if the volatile products of the reaction were to mix with the fresh reagents. If these undesirable reactions are permitted to take place to any substantial extent a serious lowering in the yield of chlorine dioxide will result. According to my invention this is prevented by bringing the reagents together in such a manner that they do not mix to any substantial extent during their production of chlorine dioxide with reagents in a different stage of the reaction or with the products formed thereby; that is, they do not mix to such an extent as thereby appreciably to impair the yield of chlorine dioxide.

My preferred method consists in preparing chlorine dioxide from a chlorate and a suitable acid or acids by causing the reagents necessary for the production of the chlorine dioxide to be brought when in solution into contact with one another and to flow down a channel during their production of chlorine dioxide. In order to minimise the possibility of any undesirable reactions between the chlorine dioxide and the reagents or other products of the reaction, the gaseous products are removed from the reaction vessel as they are formed, and this may conveniently be done by suction or by increasing the pressure within the reaction vessel by the introduction therein of a gas which will not react with the chlorine dioxide. A suitable gas which will not so react is air, and I include all such gases within the expression "inert gas."

The reagents which I prefer to use are sodium chlorate on the one hand and hydrochloric acid with or without sulphuric acid on the other hand. A chloride may be used in solution with the chlorate and a mineral acid to free the hydrochloric acid required. The hydrochloric acid first reacts with the sodium chlorate to produce chloric acid, and then the chloric acid is reduced by the hydrochloric acid to yield chlorine dioxide, according to the following equation, namely:

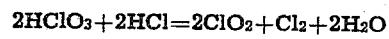
$$2HClO_3 + 2HCl = 2ClO_2 + Cl_2 + 2H_2O$$

The chlorine may subsequently be removed in known manner from admixture with the chlorine dioxide.

The salt of chloric acid preferred is sodium chlorate because it is inexpensive and it is highly soluble in water; unlike magnesium chlorate and calcium chlorate it contains no water of crystallization. The smooth production of the gas is greatly assisted and bumping avoided py the use of a porous material such as pumice.

The reaction may take place in the cold although the application of heat increases the reaction rate, and it is therefore of advantage to carry out the reaction at a temperature within the range of about 49 to 71° C. A substantially higher temperature is liable to induce decomposition while at a lower temperature the reaction is slow.

Under such conditions of low temperature in the absence of organic substances the reaction proceeds smoothly, and the cost is low. Furthermore in view of the fact that the reagents are all in solution when mixed together, and that undesirable reactions are minimised the process is easy of control and is capable of simple and ready application on an industrial scale.

However, in order to stabilize the product it is preferable for the chlorine dioxide to be mixed while in the reaction vessel with an inert gas together with which the chlorine dioxide is carried away. The reaction gases are thus diluted and after being led away they may be cooled and the temperature kept substantially below the decomposition point, that is to say, below about 65° C.

Stability is further assisted by working in an atmosphere saturated with water vapour, and this is conveniently done by the removal of the chlorine dioxide as produced in a stream of inert gas saturated with water vapour.

Apparatus suitable for carrying out the process of the invention is illustrated diagrammatically in the accompanying drawing, it being understood that some parts of the apparatus may be made of porcelain or glass, and the piping and other parts of indiarubber or ebonite or other materials resistant to the corrosive action of the acid.

In carrying the invention into effect in an apparatus such as illustrated a solution of sodium chlorate of a concentration of 33% may be contained within a tank 1 and the acid mixture made of nine parts of sulphuric acid, six parts of water and eighty-five parts of concentrated hydrochloric acid contained in the tank 2. These liquids are caused to flow under control at rates of flow adjusted to give the maximum yield into a receiving vessel 3, which is mounted in position above and upon the reaction vessel 4, after first passing through the respective meters 5 and 6. The reaction vessel 4 is advantageously of a cylindrical form having mounted on its inner periphery a helical channel 7, down which the solution of the mixed reagents from the receiving vessel 3 passes slowly while the reaction proceeds and chlorine dioxide and chlorine are evolved. The solution discharges into the bottom of the vessel 4, where the spent solution freed of substantially all the gases produced, and consisting mainly of water containing sodium sulphate and sodium chloride in solution with an excess of acid may accumulate and overflow into a discharge pipe 8 and thence into a vessel 9 where a water seal is maintained from which the solution may discharge. Pumice or other inert porous material in granular condition may advantageously be laid at the bottom of the helical channel 7, through which the liquid reaction mixture may pass in its course. By such means the smooth and regular production of the gas is facilitated.

The reaction vessel 4 may be provided with a surrounding jacket 10 filled with water or other liquid maintained, for example by means of an electrical resistance heater 11, at a determined temperature within the preferred range. The gaseous reaction products which consist of chlorine dioxide together with a proportion of chlorine are withdrawn from the reaction vessel 4. Air under pressure may be used for the purpose of producing a suction to remove the gases as formed by passing air through an ejector 12, whereby the gases produced are drawn upwardly to an outlet 21 at the upper end of the reaction vessel and are discharged through an outlet pipe 13.

Within the reaction vessel 4 a condenser 14 may be concentrically mounted enclosed in a surrounding perforated casing 15, through which all the gases pass before they emerge by the pipe 21 at the lower end of which is a cup-shaped bubbler 16' which receives any excess water vapour in the gases which condenses upon the outer surface of the condenser 14.

The condenser 14 is cooled by a circulating cooling liquid, such as water, which passes down the central pipe 18 extending into the condenser 14, the cooling liquid then flowing upwardly to the transversely disposed outlet 19. Air is forced along the pipe 17 and 16" as a result of which the liquid in the bubbler is purified from any traces of chlorine dioxide and the incoming air is saturated with water vapour to stabilise the product and to regulate evaporation.

For the purpose of completely removing the gases from the spent solution, on discharge at the bottom of the reaction vessel 4 and also to supply air saturated with water vapour, provision is advantageously made for the passage of air upwardly through a pipe or ring 16, connected to the pipe 17 through which air may pass under control for the agitation of the spent solution 20, accumulated at the bottom of the reaction vessel. Thus the air is saturated with water vapour by its passage through the spent solution 20, while at the same time the remaining traces of gas are removed, and the water saturated air then passes upwardly through the reaction vessel and continuously dilutes the gases. The gases reach the outlet pipe 21 after first passing through the perforated casing 15 in which the condenser is enclosed, so that the gases are thus cooled and excess water vapour removed together with any vapours of hydrochloric acid that may be present. The diluted gases thus withdrawn from the reaction vessel 4 are removed and pass out through the outlet of the ejector 12.

I claim:

1. A method of producing chlorine dioxide, consisting in contacting a solution of a chlorate with an acid reactant and constraining the reaction mixture so formed to flow in an open stream without further addition of any reagent whereby throughout the reaction for the production of chlorine dioxide the reaction mixture at any position in the stream is prevented from contact and admixture with the reaction mixture at any other position in the stream at which the reaction is at a different stage, and removing the gaseous reaction products from contact with all parts of the reaction mixture as they are liberated.

2. A method of producing chlorine dioxide as specified in claim 1, in which the stream of the reaction mixture is caused to flow in a determined course during the reaction in the stream.

3. A method of producing chlorine dioxide as specified in claim 1, in which the reactants are sodium chlorate in solution and hydrochloric acid.

4. A method of producing chlorine dioxide as specified in claim 1, in which the reactants are sodium chlorate in solution, a chloride and a mineral acid.

5. A method of producing chlorine dioxide as specified in claim 1 in which the reactants are sodium chlorate in solution, hydrochloric acid and sulphuric acid.

6. A method of producing chlorine dioxide as specified in claim 1, in which the gaseous reaction products are removed from contact with all parts of the reaction mixture immediately on their liberation from the reaction mixture by passing over the reaction mixture an inert carrier gas.

7. A method of producing chlorine dioxide as specified in claim 1, in which the gaseous reaction products are removed from contact with all parts of the reaction mixture immediately on their liberation from the reaction mixture by passing over the reaction mixture an inert gas containing water vapour.

8. A method of producing chlorine dioxide as specified in claim 1, in which the waste reaction mixture is collected at the conclusion of the reaction and air is passed therethrough.

9. A method of producing chlorine dioxide, consisting in contacting a solution of a chlorate with an acid reactant and constraining them to flow together in an open stream without further addition of any reagent, in such proportions that the reaction for the production of chlorine dioxide may proceed according to the equation $$2HClO_3 + 2HCl = 2ClO_2 + Cl_2 + 2H_2O$$

and preventing the reaction mixture formed by them at any position in the stream from contact and admixture with the reaction mixture at any other position at which the reaction is at a different stage, and removing the gaseous reaction products from contact with all parts of the reaction mixture as they are liberated.

10. A method of producing chlorine dioxide by contacting a solution of sodium chlorate and an acid reactant according to the conditions specified in claim 1 in which the concentration of the chlorate is of the order of 33%.

11. A method of producing chlorine dioxide according to the conditions specified in claim 1 at a temperature within the range of 49° C. to 71° C.

12. A method of producing chlorine dioxide according to the conditions specified in claim 1, in which the gaseous reaction products are cooled after removal from the reaction vessel.

CYRIL HARRY EVANS.